UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

DERIVATIVE OF PIASELENOL.

1,074,425.

Specification of Letters Patent.

Patented Sept. 30, 1913.

No Drawing.

Application filed January 29, 1913. Serial No. 744,876.

*To all whom it may concern:*

Be it known that I, EMIL FISCHER, doctor of philosophy, professor of chemistry, citizen of the German Empire, residing at Berlin, Germany, have invented new and useful Improvements in New Derivatives of Piaselenol, of which the following is a specification.

It is known that ortho-phenylenediamin can be combined with selenious acid forming piaselenol:

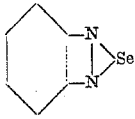

(see *Berichte der Deutschen Chemischen Gesellschaft* vol. 22, 1889, p. 862 and 2895). The hitherto described compounds of this class however are only with great difficulty soluble in water and in alkali and are therefore unsuitable for introduction into the blood circuit.

It has now been found that derivatives of piaselenol which are easily soluble in alkali and therapeutically valuable for the treatment of tumors and for other purposes can be obtained by the action of selenious acid on derivatives of aromatic ortho-diamins of an acid character, such as oxy-, carboxylic-, sulfonic acid or other alkali soluble derivatives of aromatic ortho-diamins. These derivatives of the present invention have most probably the graphically represented formula

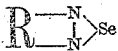

R being an aromatic nucleus containing therein groups of an acid character.

In order to illustrate the new process more fully the following examples are given, the parts being by weight:

*Example 1—Production of para-oxypiaselenol.*—1.2-diamino-4-oxybenzene hydrochlorid (*Journ. für Prakt. Chemie* 2, 43, 1891, p. 70) is dissolved in water and an aqueous solution of the equivalent quantity of sodium hydroselenit is added to it. The oxypiaselenol which very soon crystallizes from the mixture is collected on a filter and recrystallized from hot water with addition of a little animal charcoal. It has the formula:

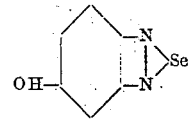

and forms yellowish-brown needles having no sharp melting point. On being heated in a capillary melting point tube it begins to sinter being colored red below 200° C. and melts at about 209° C. with evolution of gas to a dark red liquid. It dissolves in the equivalent quantity of alkali with a red to yellowish-red color according to the concentration of the solution. The same oxypiaselenol is obtained when free 1.2-diamino-4-oxybenzene reacts in aqueous solution upon selenious acid.

*Example 2—Production of 2.3-piaselenol-1-carboxylic acid.*—2.3-diaminobenzoic acid hydrochlorid is dissolved in water and the calculated quantity of selenious acid dissolved in water is added thereto. After a short time the 2.3-piaselenol-1-carboxylic acid separates as a light pink colored crystalline precipitate. It is collected on a filter and recrystallized from a large quantity of hot water. It melts in the capillary tube after previous sintering at 222–223° C. (corr.) It has the formula:

$$C_7H_4O_2N_2Se$$

and yields easily soluble alkali salts. It is soluble in cold water only with very great difficulty. Even boiling water and alcohol dissolve it only with difficulty.

*Example 3—Production of 3.4-piaselenol-1-carboxylic acid.*—This compound is produced from the 3.4-diaminobenzoic acid hydrochlorid in the same way as the isomeric compound described in Example 2. It is an almost colorless crystalline powder and can be purified by crystallization from hot dilute alcohol. It has no constant melting point. On being heated in the capillary tube it darkens gradually while sintering at about 260° C., and melts on quick heating at about 290° with decomposition. Its alkaline salts are easily soluble in water. Its solubility in other solvents resembles the solubility of its isomer.

*Example 4—Production of 2.3-piaselenol-4-methyl-5-amino-1-sulfonic acid.—*

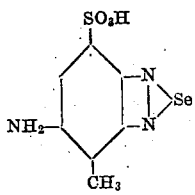

2.3.5-triamino-4-methylbenzene-1-sulfonic acid or its hydrochlorid is dissolved in the calculated quantity (one or two molecules) of a highly diluted caustic soda lye, one molecule of acid sodium selenit is added to this solution and then very slowly a $\frac{1}{10}$ normal hydrochloric acid until a mass of small yellow needles is precipitated. These needles are on standing of the mixture converted into a dirty yellow fine crystalline precipitate which is very difficultly soluble in most of the known organic solvents. It is therefore advisable to convert the acid into its sodium salt. For this purpose the precipitate is dissolved in hot dilute caustic soda solution, from which on cooling the sodium salt crystallizes in reddish-yellow needles. It can be purified by crystallization from water. The air-dry salt contains water of crystallization which can be completely removed by evaporation *in vacuo* at 100° C. The dried salt has the formula:

$$C_7H_6O_3N_3SSeNa$$

and is so soluble at ordinary temperature in water, that a 4 per cent. solution can be produced. The 2.3.5-triamino-4-methylbenzene-1-sulfonic acid used as parent material is obtained by reducing the azo-dye obtained from diazotized para-nitranilin-ortho-sulfonic acid and 2.6-diaminotoluene-4-sulfonic acid. The new acid thus obtained is rather acid. It is rather difficultly soluble in cold water, it crystallizes in small needles and decomposes on being heated. It is easily soluble in alkalis and alkaline carbonates. The hydrochloric salt of the sulfonic acid dissolves rather easily in cold water whereby it is partly split into its components, the sulfonic acid crystallizing out.

*Example 5—Production of 1.2-naphtho-piaselenol-5.7-disulfonic acid.—*

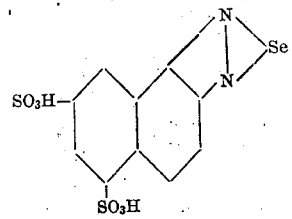

3 parts of 1.2-diaminonaphthalene-5.7-disulfonic acid hydrochlorid are dissolved in 50 parts of water and a concentrated solution of 2 parts of acid sodium selenit is added thereto. After a short time a solution of barium chlorid is added by which means the barium salt of naphthopiaselenol-disulfonic acid separates. It crystallizes from boiling water in long slightly colored needles. The air-dry salt contains about 9 per cent. of water of crystallization, which it loses at 100° C. at a pressure of 10–20 mm. The dried salt has the formula:

$$C_{10}H_4O_6N_2S_2SeBa.$$

From the barium salt the free sulfonic acid or the sodium salt can be produced both being easily soluble in water.

I claim:—

1. As new products the new derivatives of piaselenol having most probably the following general formula:

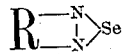

R being an aromatic nucleus containing in this nucleus groups of an acid character; forming soluble salts with alkalis; and being therapeutically valuable remedies for the treatment of tumors, substantially as described.

2. As a new product the new para-oxy-piaselenol having most probably the formula:

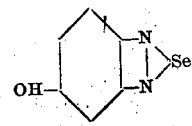

crystallizing from water in the shape of yellowish-brown needles melting at about 200–209° C. with evolution of gas; being soluble in dilute caustic alkali with a red to yellowish-red coloration; and being a therapeutically valuable remedy for the treatment of tumors, substantially as described.

In testimony whereof I have hereunto set my hand in the presence of two subscribing witnesses.

EMIL FISCHER.

Witnesses:
 WOLDEMAR HAUPT,
 HENRY HASPER.